Patented Feb. 6, 1940

2,189,722

UNITED STATES PATENT OFFICE 2,189,722

ESTERS OF HEXAHYDRO PHTHALIC ACID

Charles F. Winans, Akron, Ohio, assignor to Wingfoot Corporation, Wilmington, Del., a corporation of Delaware No Drawing. Application October 2, 1937, Serial No. 167,028

5 Claims. (Cl. 260—485)

This invention relates to esters of hexahydro phthalic acid. More particularly it relates to di (alkoxy alkyl) esters of hexahydro phthalic acid.

There are known many varieties of materials which are useful as plasticizers in molding compositions, coating compositions, etc. Of these materials, some are derivatives of phthalic acid. According to the present invention a new class of materials has been discovered, which class comprises substances which by their combination of physical and chemical characteristics are eminently suited for use as plasticizers. They are free from undesirable color, are quite stable, are nonvolatile to a high degree, and are readily miscible with a large number of commercial resins. They find particular application in compositions containing ketone resins such as cyclohexanone resins, polystyrene, poly vinyl chloride, glyptal resins, modified glyptal resins, phenol-formaldehyde resins, modified phenol-formaldehyde resins, copolymers of styrene and dichlorethylene, cellulose nitrate, cellulose acetate, ethyl cellulose, coumarin resins, etc. They may also be used with rubber derivatives such as the chloride and hydrochloride and condensation products derived by treating rubber with chlorostannic acid, sulfonic acids, etc.

The materials of the invention may be particularly described as di (alkoxy alkyl) esters of hexahydro phthalic acid. They may be prepared by reacting an alkoxy alkyl alcohol with hexahydro phthalic acid or they may alternatively be prepared by reacting the alkoxy alkyl alcohol with phthalic acid and hydrogenating the product so formed. Because of the practical difficulties of preparing hexahydro phthalic acid, it is somewhat more desirable to use the latter method.

Any alkoxy alkyl alcohol may be employed. Several very suitable materials are commercially available under the trade names of Cellosolve, Methyl Cellosolve and Butyl Cellosolve, which are respectively the ethyl, methyl and butyl mono ethers of ethylene glycol. There are also available the methyl, ethyl, and butyl ethers of di ethylene glycol corresponding to the formula

R—O—CH$_2$—CH$_2$—O—(CH$_2$—CH$_2$)—OH in which R is methyl, ethyl or butyl. Other suitable materials are the mono alkyl ethers of the propane diols, the butane diols, etc.

Any of the foregoing materials or an analogous alkoxy alkyl alcohol is reacted with phthalic acid or phthalic anhydride to form the corresponding ester and this ester is then hydrogenated to the hexahydro phthalate. The hydrogenation may be conducted according to any of the well-known procedures and in the presence of any of the well-known hydrogenation catalysts, but it is found to proceed particularly well in the presence of a finely divided metallic powder prepared from an alloy of nickel and aluminum by the process of U. S. Patent No. 1,628,190 to Raney, such a catalyst being known in the art as Raney nickel. The time required for the hydrogenation will depend upon the temperature of the reaction and the pressure employed. In general, a pressure of 40 atmospheres of hydrogen and a temperature in the neighborhood of 200° C. will be found satisfactory. However, these conditions may be varied since temperatures as low as 100° C. and somewhat higher than 200° C. and pressures as high as 125 atmospheres have been found to work well.

During the hydrogenation there is ordinarily some fission of the ether linkage with the production of some alkyl alcohol and di alkyl hexahydro phthalate (in the case of the methoxy ethyl ester of hexahydro phthalic acid yielding methyl alcohol and diethyl hexahydro phthalate) but this side reaction usually occurs in relatively small amount.

The following example will serve to demonstrate the method of preparing materials of the invention.

Example

Two hundred fifty grams of methyl cellosolve phthalate and 7½ grams of nickel catalyst were heated in a shaking autoclave under an initial hydrogen pressure of about 90 atmospheres. After a total of 60 minutes the temperature had reached 200° C. and absorption of hydrogen was quite rapid. After a total of 110 minutes, the temperature remaining at 200° C., the total absorption of hydrogen was slightly more than that required for the production of the hexahydro derivative. Distillation of the filtered reaction product gave certain low-boiling decomposition products, such as methyl alcohol and diethyl hexahydro phthalate but the bulk of the material was di (beta methoxy ethyl) hexahydro phthalate which was obtained as a water-white, oily liquid boiling at 150–170° C. at 2 mm. pressure. The yield was about 203 grams, which corresponded to 81.3% of the theoretical.

By the use of other alkoxy alkyl alcohols in the place of the beta methoxy ethyl alcohol (methyl cellosolve) employed in making the methyl cellosolve phthalate used in the preceding example, various other di (alkoxy alkyl) esters of hexahydro phthalic acid may be prepared. As previously indicated, the hydrogenation may be conducted under conditions varying considerably from those in the example, both as to temperature and pressure employed, as well as the catalyst used.

Thus, while only the preferred forms of the invention have been described in detail, it will be apparent to those skilled in the art that various modifications may be made therein without departing from the spirit of the invention or the scope of the appended claims, in which it is intended to cover by suitable expression all features of patentable novelty residing in the invention.

This application is in part a continuation of my copending application 40,303 filed September 12, 1935.

I claim:

1. Di (alkoxy alkyl) esters of hexahydro phthalic acid.
2. Di (beta alkoxy ethyl) esters of hexahydro phthalic acid.
3. Di (beta methoxy ethyl) hexahydro phthalate.
4. Di (beta ethoxy ethyl) hexahydro phthalate.
5. Di (beta butoxy ethyl) hexahydro phthalate.

CHARLES F. WINANS.